(12) United States Patent
Li

(10) Patent No.: US 8,838,892 B2
(45) Date of Patent: Sep. 16, 2014

(54) DATA STORAGE METHOD AND STORAGE DEVICE

(71) Applicant: Huawei Technologies Co., Ltd., Guangdong (CN)

(72) Inventor: Xiaohua Li, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/029,238

(22) Filed: Sep. 17, 2013

(65) Prior Publication Data

US 2014/0189236 A1    Jul. 3, 2014

Related U.S. Application Data

(63) Continuation of application No. PCT/CN2012/087857, filed on Dec. 28, 2012.

(51) Int. Cl.
*G06F 12/00* (2006.01)
*G06F 3/06* (2006.01)

(52) U.S. Cl.
CPC ............ *G06F 3/0683* (2013.01); *G06F 3/0665* (2013.01); *G06F 3/061* (2013.01)
USPC ............................ 711/114; 711/117; 711/170

(58) Field of Classification Search
CPC ...... G06F 3/0689; G06F 12/08; G06F 12/023
USPC ......................... 711/114, 117, 170
See application file for complete search history.

(56) References Cited

U.S. PATENT DOCUMENTS

| | | | |
|---|---|---|---|
| 8,380,942 B1 * | 2/2013 | Corddry et al. | 711/154 |
| 2008/0082729 A1 | 4/2008 | Moon et al. | |
| 2009/0198748 A1 * | 8/2009 | Ash et al. | 707/204 |
| 2011/0208938 A1 | 8/2011 | Carr et al. | |
| 2011/0258405 A1 * | 10/2011 | Asaki et al. | 711/162 |

FOREIGN PATENT DOCUMENTS

| | | |
|---|---|---|
| CN | 101223498 A | 7/2008 |
| CN | 101458613 A | 6/2009 |
| CN | 101510145 A | 8/2009 |
| CN | 101645837 A | 2/2010 |
| CN | 102147770 A | 8/2011 |
| CN | 102541470 A | 7/2012 |
| CN | 102609360 A | 7/2012 |

* cited by examiner

*Primary Examiner* — Gurtej Bansal
(74) *Attorney, Agent, or Firm* — Huawei Technologies Co., Ltd.

(57) ABSTRACT

The embodiments of the present invention provide a data storage method, including: sending a performance level request to a storage device, which is used to query information about performance level of one or more logical unit number LUNs in the storage device; receiving a response sent by the storage device in response to the performance level request, wherein the response comprises the information about performance levels of the LUNs; and obtaining performance levels of the LUNs according to the information about performance levels of the LUNs so that data to be stored is written into a LUN of a corresponding performance level according to a accessing frequency level of the data to be stored comprised in a write-data instruction when the write-data instruction is received.

8 Claims, 6 Drawing Sheets

DATA STORAGE METHOD AND STORAGE DEVICE

CROSS-REFERENCE TO RELATED APPLICATIONS

This application is a continuation of International Patent Application No. PCT/CN2012/087857, filed on Dec. 28, 2012, which is hereby incorporated by reference in its entirety.

FIELD OF THE INVENTION

The present invention relates to storage technologies, and in particular, to a data storage method and a storage device.

BACKGROUND OF THE INVENTION

In a storage system, different services have different requirement models for storage performance. For the same data, the requirement model for its service access performance even varies with time. Therefore, it is urgently necessary to adaptively allocate storage media of different performance according to service access requirements.

In the prior art, a storage system is hierarchically managed according to the type of the storage media. For example, a solid state drive (Solid State Drive, SSD) is a level-1 storage; a serial attached SCSI (Serial Attached SCSI, SAS) or fiber channel (Fiber Channel, FC) hard disk drive (Hard Disk Drive, HDD) is a level-2 storage, where SCSI (Small Computer System Interface) is an acronym of small computer system interface; a serial advanced technology attachment (Serial Advanced Technology Attachment, SATA) or near line (Near Line, NL) serial attached SCSI (Serial Attached SCSI, SAS) HDD is a level-3 storage. While a system is running, the level-1 storage may provide the storage space that meets high performance requirements, the level-2 storage may provide the storage space that meets ordinary performance requirements, and the level-3 storage may provide the storage space that meets low performance requirements. With change of the data access service model, the storage device migrates data between different types of media dynamically, migrates hotspot data to high-performance media, and migrates non-hotspot data to low-performance media.

The method of hierarchical management based on the type of storage media properly accomplishes hierarchical storage based on a hard disk management mode. However, the management of the existing storage system depends on a storage administrator's specifying a performance level of the corresponding storage space. That fulfills the purpose of identifying the performance of a LUN to some extent and helps the system implement hierarchical storage, but depending on the storage administrator's specifying the performance level beforehand.

SUMMARY OF THE INVENTION

The embodiments of the present invention provide a data storage method, a storage space management device, and a storage device to implement LUN-specific hierarchical storage.

In a first aspect, an embodiment of the present invention provides a data storage method, including:

sending a performance level request to a storage device, which is used to query information about performance level of one or more logical unit number LUNs in the storage device;

receiving a response sent by the storage device in response to the performance level request, wherein the response comprises the information about performance levels of the LUNs; and obtaining performance levels of the LUNs according to the information about performance levels of the LUNs so that data to be stored is written into a LUN of a corresponding performance level according to a accessing frequency level of the data to be stored comprised in a write-data instruction when the write-data instruction is received.

In a first feasible implementation manner according to the first aspect, the performance level request comprises a world wide name WWN field, wherein the WWN field is used to identify the LUN; and the response sent in response to the performance level request comprises a logical unit number list LUN List field so that the information about performance level of the LUN is carried in the LUN List field.

In combination with the first feasible implementation manner according to the first aspect, in a second feasible implementation manner of the first aspect, a value contained in the WWN field in the performance level request is 0s in order to query information about performance level of all LUNs in the storage device; and the LUN List field in the response sent in response to the performance level request comprises a WWN of each LUN and information about performance level of each LUN in the storage device, wherein the information about performance level of each LUN comprises a performance value range of the LUN.

In combination with the first feasible implementation manner of the first aspect, in a third feasible implementation manner of the first aspect, the WWN field in the performance level request is a WWN of the LUN to query information about performance level of at least one LUN in the storage device; and the LUN List field in the response sent in response to the performance level request comprises a WWN of each LUN and information about performance level of each LUN, wherein the information about performance level of each LUN comprises a performance value range of the LUN.

In a second aspect, an embodiment of the present invention provides a data storage method, including:

receiving a performance level request sent by a storage space management device, which is used to query information about performance level of one or more LUNs in a storage device;

obtaining the information about performance levels of the LUNs according to the performance level request; and sending a response to the storage space management device in response to the performance level request, wherein the response sent in response to the performance level request comprises the information about performance levels of the LUNs; and the storage space management device obtains a performance levels of the LUN according to the information about performance levels of the LUNs so that data to be stored is written into a LUN of a corresponding performance level according to a accessing frequency level of the data to be stored comprised in a write-data instruction when the write-data instruction is received.

In a first feasible implementation manner according to the second aspect, the performance level request comprises a world wide name WWN field, wherein the WWN field is used to identify the LUN; and the response sent in response to the performance level request comprises a logical unit number list LUN List field so that the information about performance level of the LUN is carried in the LUN List field.

In combination with the first feasible implementation manner according to the second aspect, in a second feasible implementation manner of the second aspect, a value contained in the WWN field in the performance level request is 0s to query information about performance level of all LUNs in the storage device.

the LUN List field in the response sent in response to the performance level request comprises a WWN of each LUN and information about performance level of each LUN in the storage device, wherein the information about performance level of each LUN comprises a performance value range of the LUN.

In combination with the first feasible implementation manner of the second aspect, in a third feasible implementation manner of the second aspect, the WWN field in the performance level request is a WWN of the LUN to query information about performance level of at least one LUN in the storage device; and the LUN List field in the response sent in response to the performance level request comprises a WWN of each LUN and information about performance level of each LUN, wherein the information about performance level of each LUN comprises a performance value range of the LUN.

In a third aspect, an embodiment of the present invention provides a storage space management device, including a processor, a communication interface, and a communication bus, where the processor communicates with the communication interface through the communication bus; and the processor is configured to send a performance level request to a storage device, which is used to query information about performance level of one or more logical unit number LUNs in the storage device; receive a response sent by the storage device in response to the performance level request, wherein the response comprises the information about performance levels of the LUNs; and obtain performance levels of the LUNs according to the information about performance levels of the LUNs so that data to be stored is written into a LUN of a corresponding performance level according to a accessing frequency level of the data to be stored comprised in a write-data instruction when the write-data instruction is received.

In a first feasible implementation manner according to the sixth aspect, the performance level request comprises a world wide name WWN field, wherein the WWN field is used to identify the LUN; and the response sent in response to the performance level request comprises a logical unit number list LUN List field so that the information about performance level of the LUN is carried in the LUN List field.

In combination with the first feasible implementation manner according to the sixth aspect, in a second feasible implementation manner according to the sixth aspect, a value contained in the WWN field in the performance level request are 0s in order to query information about performance level of all LUNs in the storage device; and the LUN List field in the response sent in response to the performance level request comprises a WWN of each LUN and information about performance level of each LUN in the storage device, wherein the information about performance level of each LUN comprises a performance value range of the LUN.

In combination with the first feasible implementation manner according to the sixth aspect, in a third feasible implementation manner of the sixth aspect, the WWN field in the performance level request is a WWN of the LUN to query information about performance level of at least one LUN in the storage device; and the LUN List field in the response sent in response to the performance level request comprises a WWN of each LUN and information about performance level of each LUN, wherein the information about performance level of each LUN comprises a performance value range of the LUN.

In a fourth aspect, an embodiment of the present invention provides a storage device, including a processor, a communication interface, and a communication bus, where the processor communicates with the communication interface through the communication bus; and the processor is configured to receive a performance level request sent by a storage space management device, which is used to query information about performance level of one or more LUNs in a storage device; obtain the information about performance levels of the LUNs according to the performance level request; send a response to the storage space management device in response to the performance level request, wherein the response sent in response to the performance level request comprises the information about performance levels of the LUNs; and the storage space management device obtains a performance levels of the LUN according to the information about performance levels of the LUNs so that data to be stored is written into a LUN of a corresponding performance level according to a accessing frequency level of the data to be stored comprised in a write-data instruction when the write-data instruction is received.

In a first feasible implementation manner according to the seventh aspect, the performance level request comprises a world wide name WWN field, wherein the WWN field is used to identify the LUN; and the response sent in response to the performance level request comprises a logical unit number list LUN List field so that the information about performance level of the LUN is carried in the LUN List field.

In combination with the first feasible implementation manner according to the seventh aspect, in a second feasible implementation manner of the seventh aspect, a value contained in the WWN field in the performance level request are 0s to query information about performance level of all LUNs in the storage device; and the LUN List field in the response sent in response to the performance level request comprises a WWN of each LUN and information about performance level of each LUN in the storage device, wherein the information about performance level of each LUN comprises a performance value range of the LUN.

In combination with the first feasible implementation manner according to the seventh aspect, in a third feasible implementation manner of the seventh aspect, the WWN field in the performance level request is a WWN of the LUN to query information about performance level of at least one LUN in the storage device; and the LUN List field in the response sent in response to the performance level request comprises a WWN of each LUN and information about performance level of each LUN, wherein the information about performance level of each LUN comprises a performance value range of the LUN.

In the embodiments of the present invention, a storage space management device queries a storage device for information about performance level of a LUN included in the storage device, and obtains a performance level of the LUN according to the information about performance level. Therefore, in the embodiments of the present invention, the performance level of the LUN is obtained without depending on a storage administrator to configure the performance level beforehand. Therefore, when data needs to be written into the storage device after a write-data instruction is received, the storage space management device can write data to be stored into LUNs of different performance levels according to the accessing frequency level of the data to be stored, thereby implementing LUN-specific hierarchical storage.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show some embodiments of the present invention, and persons of ordinary skill in the art may still derive other drawings from these accompanying drawings without creative efforts.

DETAILED DESCRIPTION OF THE EMBODIMENTS

To make the objectives, technical solutions, and advantages of the embodiments of the present invention more comprehensible, the following clearly and describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiment of the present invention without creative efforts shall fall within the protection scope of the present invention.

Figure 1:
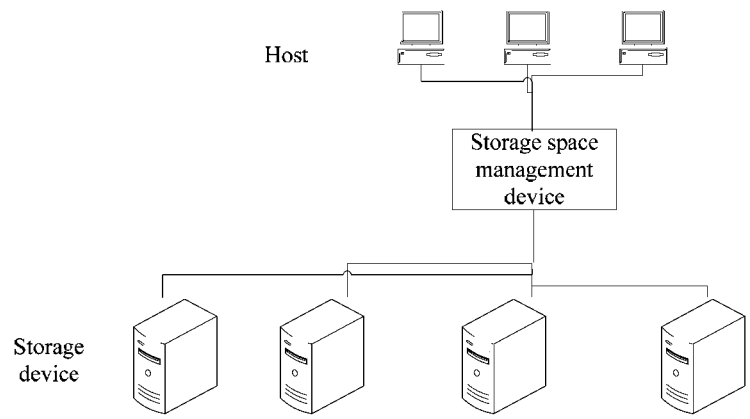
FIG. 1 is a schematic diagram of an application network architecture of a data storage method according to an embodiment of the present invention.

The data backup methods provided in the embodiments of the present invention may be implemented on a storage system. FIG. 1 is a schematic diagram of system architecture of a data backup method according to an embodiment of the present invention. As shown in FIG. 1, the storage system at least includes a host, a storage space management device, and a storage device.

The host may include any computing device, for example, a server, a desktop computer, and so on. An operating system and other applications are installed in the host.

The storage space management device may include a storage gateway device. The storage gateway device in the embodiment of the present invention refers to a heterogeneous virtualized storage gateway device. The heterogeneous virtualized storage gateway device is an intermediate device between the host and the storage device, and masks complexity of and difference between different physical disks of storage devices by means of mapping or abstracting. Therefore, a user can perform unified management and resource scheduling for the storage devices.

The storage device may be redundant arrays of independent disks (Redundant Arrays of Inexpensive Disks, RAID), a bunch of disks (Just a Bunch Of Disks, JBOD), or one disk drive or multiple interconnected disk drives, such as a tape library, of a direct access storage device (Direct Access Storage Device, DASD), or a tape storage device of one or more storage units.

It should be noted that, for most storage devices, physical disks included in a storage device are not displayed by an operating system directly, but the storage space provided by each physical disk is mapped to one or more logical areas, that is, a range of logical unit numbers (Logical Unit Number, LUN), which is available to the user. Therefore, read and write operations performed by the operating system on a disk are actually operations specific to a LUN. Besides, the operating system may perform operations such as partitioning and formatting to the LUN.

Figure 2A:
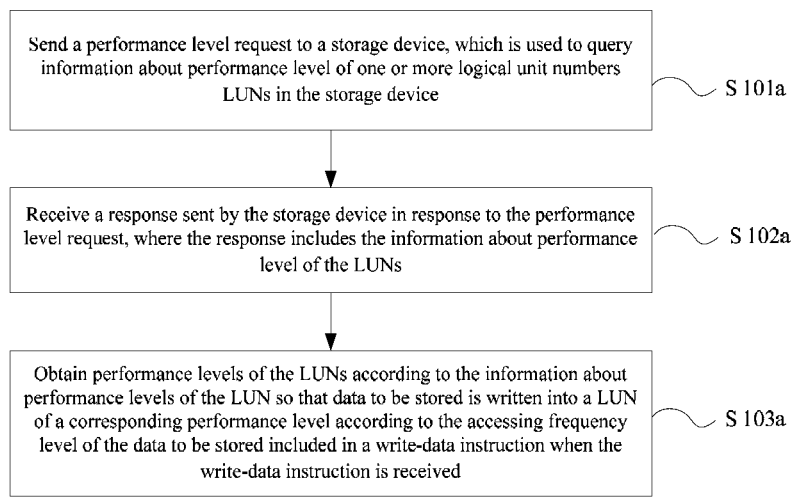
FIG. 2A is a flowchart of a data storage method according to an embodiment of the present invention.

As shown in FIG. 2A, a data storing method is provided in an embodiment of the present invention. The method may be performed by a storage space management device.

S101a. Send a performance level request to a storage device, which is used to query information about performance level of one or more logical unit numbers (LUNs) in the storage device.

Optionally, the performance level request may include a world wide name (WWN) field, where the WWN field is used to identify the LUNs.

If the value in the WWN field in the performance level request are 0s, the performance level request is for querying information about performance level of all LUNs in the storage device; if the WWN field in the performance level request is the WWN of the LUN, the request is used to query information about performance level of at least one LUN in the storage device.

S102a. Receive a response sent by the storage device in response to the performance level request, where the response includes the information about performance level of the LUNs.

Optionally, the response may include a logical unit number list (LUN List) field so that the information about performance level of the LUNs is carried in the LUN List field. Specifically, the LUN List field may include a WWN of each LUN and information about performance level of each LUN.

The information about performance levels of the LUN at least includes a performance value range of the LUN.

S103a. Obtain performance levels of the LUNs according to the information about performance levels of the LUN so that data to be stored is written into a LUN of a corresponding performance level according to the accessing frequency level of the data to be stored included in a write-data instruction when the write-data instruction is received.

In the embodiment of the present invention, the storage space management device queries the storage device for information about performance level of one or more LUN included in the storage device, and obtains the performance levels of the LUNs according to the information about performance level. Therefore, in the embodiment of the present invention, the performance level of the LUNs can be obtained without depending on a storage administrator to configure the performance level beforehand. Therefore, when data needs to be written into the storage device after a write-data instruction is received, the storage space management device can write data to be stored into LUNs of different performance levels according to the accessing frequency level of the data to be stored, thereby implementing LUN-specific hierarchical storage.

Figure 2B:
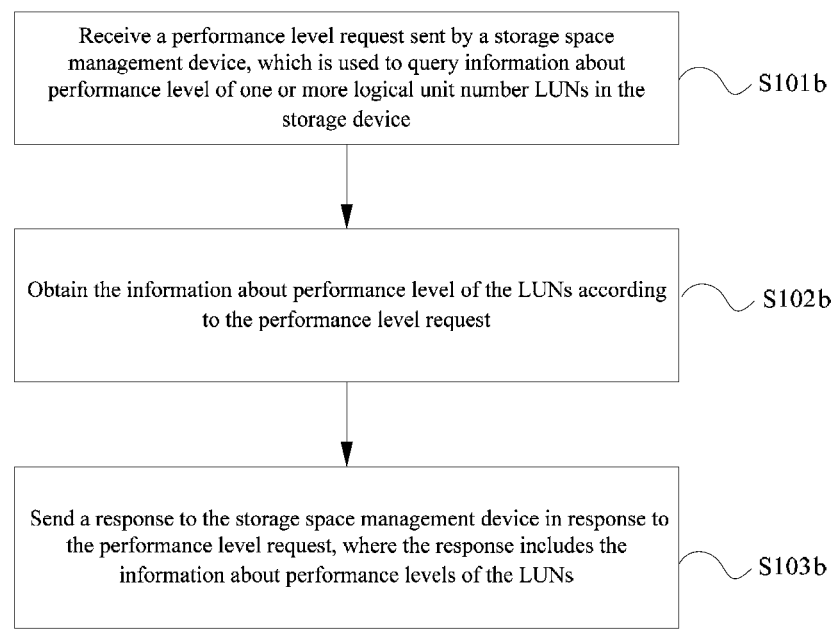
FIG. 2B is a flowchart of a data storage method according to an embodiment of the present invention.

As shown in FIG. 2B, a data storing method is provided in an embodiment of the present invention. The method may be executed by a storage device.

S101b. Receive a performance level request sent by a storage space management device, which is used to query information about performance level of one or more logical unit number LUNs in the storage device.

S102b. Obtain the information about performance level of the LUNs according to the performance level request.

S103b. Send a response to the storage space management device in response to the performance level request, where the response includes the information about performance levels of the LUNs; and the storage space management device obtains performance levels of the LUNs according to the information about performance levels of the LUNs so that data to be stored is written into a LUN of a corresponding performance level according to the accessing frequency of the data to be stored included in a write-data instruction when the write-data instruction is received.

For details about the performance level request and the response sent in response to the performance level request, reference can be made to the description in the above embodiment.

In the embodiment of the present invention, after receiving the performance level request sent by the storage space management device to query information about performance level of one or more LUNs included in the storage device, the storage device obtains the information about performance levels of the LUNs included in the storage device and sends it to the storage space management device, so that the storage space management device can obtain performance levels of the LUNs according to the information about performance level. Therefore, in the embodiment of the present invention, the storage device can obtain the performance levels of the LUNs without depending on a storage administrator to configure the performance level beforehand. In this way, when data needs to be written into the storage device after a write-data instruction is received, the storage space management device can write the data to be stored into LUNs of different performance levels according to the accessing frequency of the data to be stored, thereby implementing LUN-specific hierarchical storage.

The following describes a data storage method in detail by taking an example that information about performance level of a LUN is a performance value range of the LUN.

Figure 2C:
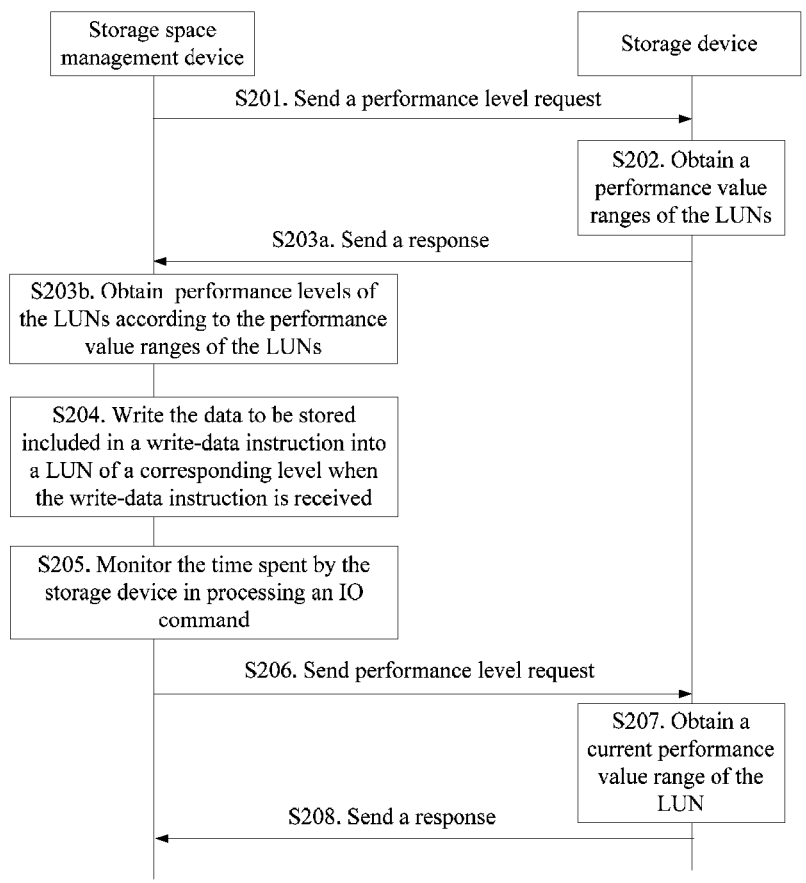
FIG. 2C is a signaling chart of a data storage method according to an embodiment of the present invention.

Referring to FIG. 2C. FIG. 2C is a signaling chart of a data storage method according to an embodiment of the present invention. As shown in FIG. 2C, a data storing method is provided in the embodiment, and the method can implement LUN-specific hierarchical storage according to the accessing frequency of the data is to be written. The method may include the following steps:

S201. A storage space management device sends a performance level request to a storage device, which is used to query information about performance levels of one or more LUN, and the information about performance level of the LUN is a performance value range of the LUN.

The performance level request may be defined as REPORT LUN CACPABILITY, which includes a WWNfield of the LUN, where the field is used to identify the LUN. Each LUN has a different WWN.

In the embodiment of the present invention, sending the performance level request to the storage device may be: sending a performance level request to the storage device, which is used to query information about performance levels of all LUNs in the storage device, and the value contained in the WWN field in the performance level request is 0s; or may be: sending the performance level request to at least one LUN in the storage device, which is used to query information about performance levels of at least one LUN in the storage device, and the WWN field in the performance level request is the WWN of the LUN to be queried.

S202. The storage device obtains a performance value range of the LUN according to the WWN field included in the performance level request.

Specifically, after receiving the performance level request sent by the storage space management device, the storage device may find the LUN according to the WWN of the LUN, so as to obtain relevant information of the LUN. The information may at least include storage media type of one or more physical disks corresponding to the LUN. Because the LUN is a logical area and is mapped from one or more physical disks, the storage media type of the physical disk corresponding to the LUN may decide the performance of the LUN. For example, the performance of an SSD is higher than that of an SAS/FC HDD, and the performance of an SAS/FC HDD is higher than that of an SATA/NL SAS HDD. Therefore, the performance of a LUN corresponding to an SSD is higher than the performance of a LUN corresponding to an SAS/FC HDD, and the performance of a LUN corresponding to an SAS/FC HDD is higher than the performance of a LUN corresponding to an SATA/NL SAS HDD.

Therefore, the storage device may obtain a performance value range of the LUN according to the relevant information of the LUN. For example, the performance value range of a LUN corresponding to an SSD are [80, 100], the performance value range of a LUN corresponding to an SAS/FC HDD are [60, 80], and the performance value range of a LUN corresponding to an SATA/NL SAS HDD are [40, 60].

Besides, the storage device may obtain the performance value range of the LUN according to other relevant information such as the IO service pressure of the LUN, the current running state of the LUN, and the composite pattern of the LUN. The storage device may obtain the performance value range of the LUN after taking all kinds of factors into consideration.

S203a. The storage device sends a response to the storage space management device in response to the performance level request, where the response includes the performance value range of the LUN.

S203b. The storage space management device obtains the performance level of the LUN according to the performance value range of the LUN.

The response sent in response to the performance level request includes a logical unit number list (LUN List) field so that the performance value range of the LUN is carried in the LUN List field. For example, the LUN List field may specifically include three subfields: One subfield is a WWN of the LUN, another subfield is an upper limit of the performance value of the LUN, and the remaining subfield is a lower limit of the performance value of the LUN.

In the embodiment of the present invention, if the performance level request is used to query the performance levels of all LUNs in the storage device, the LUN List field in the response sent in response to the performance level request is WWNs of LUNs and performance value ranges of LUNs in the storage device so that the storage space management device can obtain performance levels of LUN according to the all performance value ranges; if the performance level request is used to query the performance level of at least one LUN in the storage device, the LUN List field in the response sent in response to the performance level request includes a WWN of each LUN to be queried and a performance value range of each LUN so that the storage space management device can obtain the performance level of the LUN according to the performance value range. For example, the storage space management device may identify the performance levels of the LUNs according to the performance value ranges of the LUNs. For example, the performance level of a LUN corresponding to an SSD may be level 1 (the performance value ranges of the corresponding LUN are [80, 100]), the performance level of a LUN corresponding to an SAS/FC HDD may be level 2 (the performance value ranges of the corresponding LUN are [60, 80], and the performance level of a LUN corresponding to an SATA/NL SAS HDD may be level 3 (the performance value ranges of the corresponding LUN are [40, 60]).

S204. Write data to be stored included in a write-data instruction into a LUN of a corresponding performance level according to the performance level of the LUN and the accessing frequency level of the data to be stored included in the write-data instruction after the storage space management device receives the write-data instruction.

In an application scenario of the embodiment of the present invention (as shown in FIG. 1), the storage system is formed by at least one host, a storage space management device, and a storage device. The storage space management device in the embodiment of the present invention is a heterogeneous virtualized storage gateway device, and masks complexity of and difference between different physical disks in the storage device by means of mapping or abstracting, and therefore, only the storage space management device itself is visible to the host, and the storage device is transparent to the host.

The write-data instruction is delivered by an application in the host to the storage space management device. The write-data instruction includes the data to be stored and an address to which the data is to be written. Although the data to be stored is finally written into the storage device, because only the storage space management device is visible to the host, when the application delivers the write-data instruction, the address to which the data is to be written is an address in the LUN of the storage space management device to which the data is to be written. After receiving the write-data instruction, the storage space management device writes the data to be stored into the LUN of the corresponding level in the storage device according to the accessing frequency level of the data to be stored.

Specifically, the accessing frequency level of the data to be stored can be judged by the storage space management device according to a accessing frequency level the address carried in the write-data instruction, where the data to be stored is stored in the address. If the accessing frequency level of the address is higher than a preset hot data threshold, it is appropriate to determine that the data to be stored is hot data; if the accessing frequency level of the address is lower than a preset cold data threshold, it is appropriate to determine that the data to be stored is cold data.

Afterward, the data to be stored is written into a LUN of the corresponding performance level in the storage device according to the accessing frequency level of the data to be stored and the performance level of the LUN. Specifically, during the executing of the write-data instruction, hot data is written into a LUN of level-1 performance (the corresponding performance value ranges are [80, 100]); cold data is written into a LUN of level-3 performance (the corresponding performance value ranges are [40, 60]); and the data to be stored that is neither hot nor cold is written into a LUN of level-2 performance (the corresponding performance value ranges are [60, 80]).

It should be noted that, the address to which the data is to be written, which is used to determine hotness or coldness of the data to be stored, is different from the LUN address to which the data to be stored is finally written. The former is the address of a LUN in the storage space management device visible to the application of the host, and the latter is the address of a LUN in the storage device. The storage space management device itself may include no LUN, and the storage device may map a range of LUNs so that they are available to the storage space management device. Nevertheless, the former address may still be different from the latter address.

More specifically, a mapping between the accessing frequency of the data to be stored and the performance level of the LUN may be stored in the storage space management device by the form of a mapping table. When a write-data instruction is received, the specific LUN to which the data to be stored is to be written is known by searching the mapping table. It should be noted that the embodiment of the present invention is not limited to the form of a mapping table. All other forms suitable for storing the mapping between the accessing frequency of the data to be stored and the performance level of the LUN shall fall within the protection scope of the embodiment of the present invention. After the data to be stored in the write-data instruction is written into the LUN of the corresponding performance level in the storage device, the storage space management device may create the mapping between the application for delivering the write-data instruction and the LUN, so that when a read-data instruction from the application for reading the data to be stored is subsequently received, the data to be stored can be read after the LUN address for storing the data to be stored in the storage device is found according to the mapping.

In the embodiment of the present invention, the information about performance level of a LUN included in a storage device is queried from the storage device, and the performance level of the LUN is obtained according to the information about performance level. Therefore, in the embodiment of the present invention, the performance level of the LUN can be obtained without depending on a storage administrator to configure the performance level beforehand. Therefore, when data needs to be written into the storage device after a write-data instruction is received, the storage space management device can write data to be stored into LUNs of different performance levels according to accessing frequency of the data to be stored, thereby reaching LUN-specific hierarchical storage.

In the above embodiment, obtaining the performance level of the LUN according to the information about performance level of the LUN specifically includes: affixing a performance level label to the LUN according to the LUN's performance value range included in the response, and using the performance level label to identify the performance level of the LUN. For example, a level-1 performance level label may be affixed to a LUN whose performance value ranges are [80, 100], a level-2 performance level label may be affixed to a LUN whose performance value ranges are [60, 80], and a level-3 performance level label may be affixed to a LUN whose performance value ranges are [40, 60].

In another embodiment of the present invention, the performance level request may include a select report (select report) field. The select report field indicates whether the request is used to query the performance levels of all LUNs or the performance level of one or more LUNs in the storage device. If the performance level request is used to query the performance level of one or more LUNs in the storage device, the select report field is 01; if the performance level request is used to query the performance levels of all LUNs in the storage device, the select report field is 00.

The response sent in response to the performance level request further includes a logical unit number list length (LUN List Length) field, where the LUN List Length field indicates the length of a LUN List field. As can be learned from the above embodiment, if the performance level request is used to query the performance level of one LUN in the storage device, the LUN List field in the response sent in response to the performance level request includes a WWN of the LUN and a performance value range of the LUN. In this case, the LUN List Length field is 8, indicating that the LUN List field has 8 bytes. Specifically, the first 4 bytes are the WWN of the LUN, bytes 5 to 6 are an upper limit of the performance value of the LUN, and bytes 7 to 8 are a lower limit of the performance value of the LUN. If the performance level request is used to query the performance levels of all LUNs in the storage device, the LUN List field in the response sent in response to the performance level request is the WWNs of all LUNs and the performance value ranges of all LUNs in the storage device. In this case, the LUN List Length field is 8 multiplied by the number of LUNs in the storage device.

Besides, the performance level request may further include an operation code (operation code) field and other reserved fields. The operation code field is used to identify the operation type of the performance level request, for example, management operation, or read operation, or write operation.

It is understandable that, the performance level request and the response sent in response to the performance level request may further include some reserved fields.

In another embodiment of the present invention, the method may be applied to a storage system that includes a storage resource pool. The storage resource pool is a segment of a logical storage space, and is mapped from all LUNs.

The storage space management device may put the LUNs of the same performance level into a storage resource pool of the corresponding performance level according to performance levels of LUNs. Each storage resource pool includes at least two LUNs of the same performance level.

Specifically, according to the above embodiment, LUNs may be divided into different performance levels, and therefore, the LUNs of the same performance level may be mapped to a corresponding storage resource pool. For example, the LUNs of level-1 performance may be put into a storage resource pool of level-1 performance, and the LUNs of level-2 performance may be put into a storage resource pool of level-2 performance. Each storage resource pool includes at least two LUNs of the same performance level.

In this case, S204, the step of "write data to be stored into a LUN of a corresponding performance level according to the performance level of the LUN and the accessing frequency of the data to be stored included in the write-data instruction when the write-data instruction is received" specifically is: write data to be stored into a LUN included in a storage resource pool of a corresponding performance level according to the performance level of the LUN and the accessing frequency of the data to be stored included in the write-data instruction when the write-data instruction is received. After the data to be stored in the write-data instruction is written into the storage resource pool of the corresponding performance level, a mapping is created between an application for delivering the write-data instruction and the storage resource pool, so that the application can deliver a read-data instruction subsequently to read data in the storage resource pool.

In the above embodiment, when the data to be stored in the write-data instruction is written into the LUN, a mapping needs to be created between the application for delivering the write-data instruction and the LUN. Therefore, if the performance level of a LUN is lowered subsequently, when a write-data instruction is received, the data to be stored needs to be written into another LUN of a corresponding performance level, the mapping between the application and the original LUN needs to be deleted, and the mapping between the application and a new LUN of a corresponding performance level needs to be created. In the embodiment of the present invention, the LUNs of the same performance level are put into a storage resource pool of a corresponding performance level. If the performance level of one LUN in the storage resource pool is lowered, when a write-data instruction is received, the data may be written into another LUN whose performance level remains unchanged in the storage resource pool. Because the data to be stored is still written into this storage resource pool, no new mapping needs to be created.

In another embodiment of the present invention, the following step may be further included:

The storage space management device sends a storage space scan request to the storage device, which is used to obtain relevant information of the LUNs in the storage device. After information of all LUNs included in the storage device sent by the storage device is received, some LUNs that have not accessed a storage space can be processed by the storage space management device according to the information of all LUNs, to access the storage space.

Specifically, the storage device may send a LUN list to the storage space management device. The number of LUNs included in the storage device, which LUNs have accessed the storage space, and which LUNs have not accessed the storage space (that is, not available) can be learned from the list. Besides, a size of each LUN can also be learned.

After obtaining the relevant information of the LUNs, the storage space management device may parse the information to learn the number of LUNs included in the storage device, and format the LUNs that have not accessed the storage space or process them in other manners to make them access the storage space successfully. By sending a storage space scan request to the storage device, the information of all LUNs included in the storage device is learned, and the LUNs that have not accessed the storage space are formatted so that the LUNs can access the storage space successfully. In this way, all LUNs in the storage device are managed uniformly, and the performance levels of the LUNs can be identified subsequently.

In another embodiment of the present invention, the following step may be further included:

Step 205: The storage space management device monitors the time spent by the storage device in processing an input/output IO command, and determines whether the processing time exceeds a threshold defined for the performance level of the LUN corresponding to the IO command In the embodiment of the present invention, each IO command corresponds to a LUN. For example, a read request command is an instruction of reading data from the LUN, and a write request command is an instruction of writing data into the LUN. According to the above embodiment, each LUN has a corresponding performance level, and a threshold specific to each different performance level may be preset for a LUN of this performance level. By monitoring the processing time of the IO command in real time, whether the processing time exceeds a threshold defined for the performance level of the LUN corresponding to the IO command is determined.

S206. When the processing time exceeds the threshold defined for the performance level of the LUN corresponding to the IO command, the storage space management device sends a performance level request to the storage device.

The detailed content of the performance level request is similar to what described above, and is not repeated here any further. It should be noted that the performance level request here is used to query the performance level of a LUN in the storage device.

In practice, the performance of the LUN may change due to some factors such as IO pressure, a running state, and system faults. Therefore, when the processing time of the IO command exceeds the threshold defined for the performance level of the LUN, it is necessary to query the storage device for the performance level of the LUN again.

S207. After receiving the performance level request, the storage device may recalculate the current information about performance level of the LUN according to the factors such as the current IO pressure and running state of the LUN, system faults, and storage media of the physical disk corresponding to the LUN. Specifically, the current information about performance level of the LUN at least includes the current performance value range of the LUN. The detailed calculation method is similar to what is described above, and is not repeated here any further.

S208. The storage device sends a response to the storage space management device in response to the performance level request, where the response sent in response to the performance level request includes the current information about performance level of the LUN; and the storage space management device obtains the current performance level of the LUN according to the current information about performance level of the LUN.

The detailed content of the response sent in response to the performance level request is similar to what described above, and is not repeated here any further.

After receiving the current performance value range of the LUN which is returned by the storage device, the storage space management device may identify the current performance level of the LUN according to the performance value range, and perform different operations depending on whether the performance level of the LUN has changed, and specifically, adjust the performance level of the LUN if the performance level of the LUN has changed. Assuming that the LUN is included in a corresponding storage resource pool, the LUN may be removed out of the storage resource pool.

If the performance level of the LUN remains unchanged, the storage space management device may send a request for querying a credit value of the LUN to the storage device, and perform traffic control according to the LUN's credit value returned by the storage device.

In the embodiment of the present invention, the LUN's credit value may be a difference between the number of read/write (I/O) operations currently performed by the LUN per second and the number of read/write (I/O) operations performable by the LUN per second. For example, if the number of read/write (I/O) operations performable by the LUN per second (Input/Output Operations Per Second, TOPS) is 100 and the number of read/write (I/O) operations currently performed per second, which is an actual IOPS, is 90, the credit value of the LUN is 10. The storage space management device may perform traffic control for the LUN according to the credit value.

In the embodiment of the present invention, the processing time of the IO command is monitored in real time. Therefore, the storage space management device can adjust the performance level of the LUN dynamically to ensure that the data to be stored is stored into the LUNs of different performance levels accurately according to the accessing frequency level of the data.

Besides, a response sent by the storage device to the storage space management device in response to the request for querying a credit value may include the current performance value range of the LUN, and therefore, the storage space management device can obtain the latest performance level of the LUN according to the current performance value range of the LUN. The storage device reports the current performance value range of the LUN to the storage space management device proactively so that the number of interactions between the storage device and the storage space management device can be reduced. Specifically, the response sent in response to the query request may include not only original fields, but also a logical unit number list (LUN List) field. The LUN List field is used to carry the information about performance level of the LUN. For example, the LUN List field may specifically include three subfields: One subfield is a WWN of the LUN, another subfield is an upper limit of the performance value of the LUN, and the remaining subfield is a lower limit of the performance value of the LUN. Optionally, the response may further include a logical unit number list length (LUN List Length) field, where the LUN List Length field may indicate the length of the LUN List field. Generally, when the response includes the performance level of one LUN, the LUN List Length field is 8; when the response includes the performance levels of all LUNs in the storage device, the LUN List Length field is 8 multiplied by the number of LUNs in the storage device. In this case, the request for querying a credit value may be understood as the performance level request in the previous embodiment.

In the embodiment of the present invention, the response sent in response to the original query request is changed so that the response not only carries the credit value, but also the current performance level of the LUN in the storage device, thereby reducing the number of interactions between the storage space management device and the storage device.

Figure 3:
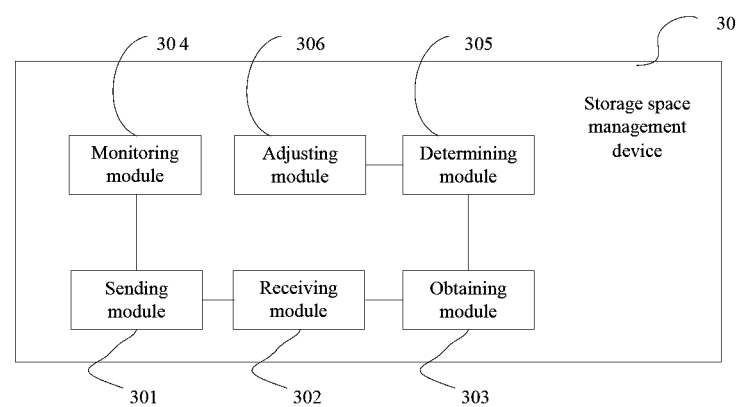
FIG. 3 is a schematic structural diagram of a storage space management device according to an embodiment of the present invention.

An embodiment of the present invention further provides a storage space management device. Specifically, referring to FIG. 3. FIG. 3 is a schematic structural diagram of a storage space management device.

The storage space management device 30 includes a sending module 301, a receiving module 302, and an obtaining module 303.

The sending module 301 is configured to send a performance level request to a storage device, which is used to query information about performance level of one or more logical unit numbers (LUNs) in the storage device.

Optionally, the performance level request may include a world wide name (WWN) field, where the WWN field is used to identify the LUNs.

If the value in the WWN field in the performance level request are 0s, the performance level request is for querying information about performance level of all LUNs in the storage device; if the WWN field in the performance level request is the WWN of the LUN, the request is used to query information about performance level of at least one LUN in the storage device.

The receiving module 302 is configured to receive a response sent by the storage device in response to the performance level request, where the response includes the information about performance level of the LUNs.

Optionally, the response may include a logical unit number list (LUN List) field so that the information about performance level of the LUNs is carried in the LUN List field. Specifically, the LUN List field may include a WWN of each LUN and information about performance level of each LUN.

The information about performance level of the LUN at least includes a performance value range of the LUN.

The obtaining module 303 is configured to obtain performance levels of the LUNs according to the information about performance levels of the LUN so that data to be stored is written into a LUN of a corresponding performance level according to the accessing frequency level of the data to be stored included in a write-data instruction when the write-data instruction is received.

In the embodiment of the present invention, the storage space management device 30 queries the storage device 40 for information about performance level of one or more LUN included in the storage device 40, and obtains the performance levels of the LUNs according to the information about performance level. Therefore, in the embodiment of the present invention, the performance level of the LUNs can be obtained without depending on a storage administrator to configure the performance level beforehand. Therefore, when data needs to be written into the storage device after a write-data instruction is received, the storage space management device 30 can write data to be stored into LUNs of different performance levels according to the accessing frequency level of the data to be stored, thereby implementing LUN-specific hierarchical storage.

The following describes a storage space management device in detail by taking an example that information about performance level of a LUN is a performance value range of the LUN.

In the above embodiment, the performance level request sent by the sending module 301 to the storage device may be defined as REPORT LUN CACPABILITY, which includes WWN field of the LUN, where the field is used to identify the LUN. Each LUN has a different WWN.

In the embodiment of the present invention, sending a performance level request to the storage device may be: sending a performance level request to the storage device, which is used to query information about performance level of all LUNs in the storage device, and the value contained in the WWN field in the performance level request are 0s; or may be: sending a performance level request to at least one LUN in the storage device, which is used to query information about performance level of the LUN in the storage device, and the WWN field of the LUN in the performance level request is the WWN of the LUN to be queried. In the above embodiment, the response which is sent by the storage device in response to the performance level request and is received by the receiving module 302 includes a performance value range of the LUN, and then the obtaining module 303 obtains the performance level of the LUN according to the performance value range of the LUN.

The response sent in response to the performance level request may include a logical unit number list (LUN List) field so that the performance value range of the LUN is carried in the LUN List field. For example, the LUN List field may specifically include three subfields: One subfield is a WWN of the LUN, another subfield is an upper limit of the performance value of the LUN, and the remaining subfield is a lower limit of the performance value of the LUN.

In the embodiment of the present invention, if the performance level request is used to query the performance levels of all LUNs in the storage device, the LUN List field in the response sent in response to the performance level request is WWNs of LUNs and performance value ranges of LUNs in the storage device so that the storage space management device can obtain performance levels of LUN according to the all performance value ranges; if the performance level request is used to query the performance level of at least one LUN in the storage device, the LUN List field in the response sent in response to the performance level request includes a WWN of each LUN to be queried and a performance value range of each LUN so that the storage space management device can obtain the performance level of the LUN according to the performance value range. For example, the storage space management device may identify the performance levels of the LUNs according to the performance value ranges of the LUNs. For example, the performance level of a LUN corresponding to an SSD may be level 1 (the performance value ranges of the corresponding LUN are [80, 100]), the performance level of a LUN corresponding to an SAS/FC HDD may be level 2 (the performance value ranges of the corresponding LUN are [60, 80], and the performance level of a LUN corresponding to an SATA/NL SAS HDD may be level 3 (the performance value ranges of the corresponding LUN are [40, 60]). Specifically, the obtaining module 303 may affix a performance level label to the LUN according to the LUN's performance value range included in the response, and use the performance level label to identify the performance level of the LUN. For example, a level-1 performance level label may be affixed to a LUN whose performance value ranges are [80, 100], a level-2 performance level label may be affixed to a LUN whose performance value ranges are [60, 80], and a level-3 performance level label may be affixed to a LUN whose performance value ranges are [40, 60].

The data to be stored included in a write-data instruction is written into a LUN of a corresponding performance level according to the performance level of the LUN and the accessing frequency level of the data to be stored included in the write-data instruction after the storage space management device 30 receives the write-data instruction. In another embodiment of the present invention, the performance level request may include a select report (select report) field. The select report field indicates whether the message is used to query the performance levels of all LUNs or the performance level of a specific LUN in the storage device. If the performance level request is used to query the performance level of a specific LUN in the storage device, the select report field is 01; if the performance level request is used to query the performance levels of all LUNs in the storage device, the select report field is 00.

The response sent in response to the performance level request further includes a logical unit number list length (LUN List Length) field, where the LUN List Length field indicates the length of a LUN List field. As can be learned from the above embodiment, if the performance level request is used to query the performance level of one LUN in the storage device, the LUN List field in the response sent in response to the performance level request includes a WWN of the LUN and a performance value range of the LUN. In this case, the LUN List Length field is 8, indicating that the LUN List field has 8 bytes. Specifically, the first 4 bytes are the WWN of the LUN, bytes 5 to 6 are an upper limit of the performance value of the LUN, and bytes 7 to 8 are a lower limit of the performance value of the LUN. If the performance level request is used to query the performance levels of all LUNs in the storage device, the LUN List field in the response sent in response to the performance level request is a WWN of each LUN and a performance value range of each LUN in the storage device. In this case, the LUN List Length field is 8 multiplied by the number of LUNs in the storage device.

Besides, the performance level request may further include an operation code (operation code) field and other reserved fields. The operation code field is used to identify the operation type of the performance level request, for example, management operation, or read operation, or write operation.

It is understandable that, the performance level request and the response sent in response to the performance level request may further include some reserved fields.

In another embodiment of the present invention, the storage space management device 30 is further applicable to a storage system that includes a storage resource pool. The storage resource pool is a segment of a logical storage space, and is mapped from all LUNs. The storage space management device further includes a storage resource pool input module (not illustrated in the figure), configured to put the LUNs of the same performance level into a storage resource pool of the corresponding performance level according to performance levels of the LUNs, where the storage resource pool includes at least two LUNs of the same performance level.

Specifically, according to the above embodiment, LUNs may be divided into different performance levels, and therefore, the LUNs of the same performance level may be mapped to a corresponding storage resource pool. For example, the LUNs of level-1 performance may be put into a storage resource pool of level-1 performance, and the LUNs of level-2 performance may be put into a storage resource pool of level-2 performance. Each storage resource pool includes at least two LUNs of the same performance level.

After receiving a write-data instruction, the storage space management device 30 writes data to be stored into a LUN included in a storage resource pool of a corresponding performance level according to the performance level of the LUN and the accessing frequency level of the data to be stored included in the write-data instruction. After the data to be stored in the write-data instruction is written into the storage resource pool of the corresponding performance level, a mapping is created between an application for delivering the write-data instruction and the storage resource pool, so that the application can deliver a read-data instruction subsequently to read data in the storage resource pool.

In the above embodiment, when the data to be stored in the write-data instruction is written into the LUN, a mapping needs to be created between the application for delivering the write-data instruction and the LUN. Therefore, if the performance level of a LUN is lowered subsequently, when a write-data instruction is received, the data to be stored needs to be written into another LUN of a corresponding performance level, the mapping between the application and the original LUN needs to be deleted, and the mapping between the application and a new LUN of a corresponding performance level needs to be created. In the embodiment of the present invention, the LUNs of the same performance level are put into a storage resource pool of a corresponding performance level. If the performance level of one LUN in the storage resource pool is lowered, when a write-data instruction is received, the data may be written into another LUN whose performance level remains unchanged in the storage resource pool. Because the data to be stored is still written into this storage resource pool, no new mapping needs to be created.

In another embodiment of the present invention, the storage space management device 30 may further include a monitoring module 304, configured to monitor the time spent by the storage device in processing an input/output IO command, and determine whether the processing time exceeds a threshold defined for the performance level of the LUN corresponding to the IO command.

In the embodiment of the present invention, each IO command corresponds to a LUN. For example, a read request command is an instruction of reading data from the LUN, and a write request command is an instruction of writing data into the LUN. According to the above embodiment, each LUN has a corresponding performance level, and a threshold specific to each different performance level may be preset for a LUN of this performance level. By monitoring the processing time of the IO command in real time, whether the processing time exceeds a threshold defined for the performance level of the LUN corresponding to the IO command is determined.

The sending module 301 is further configured to send a performance level request to the storage device when the processing time exceeds the threshold defined for the performance level of the LUN corresponding to the IO command In practice, the performance of the LUN may change due to some factors such as IO pressure, a running state, and system faults. Therefore, when the processing time of the IO command exceeds the threshold defined for the performance level of the LUN, it is necessary to query the storage device for the information about performance level of the LUN again.

The detailed content of the performance level request is similar to what described above, and is not repeated here any further. It should be noted that the performance level request here is used to query the information about performance level of a specific LUN in the storage device.

The receiving module 302 is further configured to receive a response sent by the storage device in response to the performance level request.

After receiving the performance level request, the storage device may recalculate the current information about performance level according to the factors such as the current IO pressure and running state of the LUN, system faults, and storage media of the physical disk corresponding to the LUN. Specifically, the current information about performance level of the LUN at least includes the current performance value range of the LUN. The detailed calculation method is similar to what is described above, and is not repeated here any further.

The response sent in response to the performance level request includes a current performance value range of the LUN. The detailed content of the response is similar to what described above, and is not repeated here any further.

The obtaining module 303 is further configured to obtain the current performance level of the LUN according to the current information about performance level of the LUN.

The specific obtaining method is similar to what described above, and is not repeated here any further.

The storage space management device 30 may further include:

a determining module 305, configured to identify the current performance level of the LUN according to the performance value range, and determine whether the performance level of the LUN has changed; and an adjusting module 306, configured to remove the LUN out of an original corresponding storage resource pool if the performance level of the LUN has changed.

After identifying the current performance level of the LUN, the storage space management device 30 may perform different operations depending on whether the performance level of the LUN has changed, and specifically, adjust the performance level of the LUN if the performance level of the LUN has changed. Assuming that the LUN has a corresponding storage resource pool, the LUN may be removed out of an original corresponding storage resource pool.

For details of the storage space management device 30 provided in the embodiment of the present invention, reference can be made to the description of the storage space management device in the method embodiment, and the details are not repeated herein.

Figure 4:
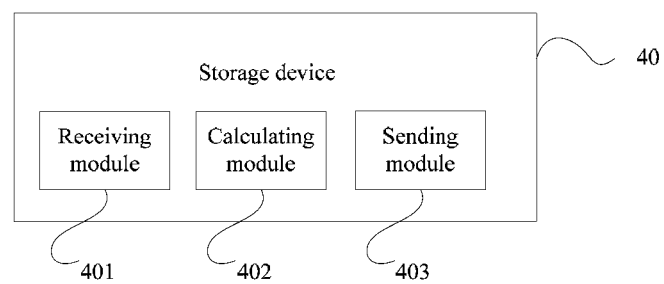
FIG. 4 is a schematic structural diagram of a storage device according to an embodiment of the present invention.

Further, an embodiment of the present invention provides a storage device 40. Specifically, referring to FIG. 4. FIG. 4 is a schematic structural diagram of a storage device 40.

The storage device 40 includes a receiving module 401, a calculating module 402, and a sending module 403.

The receiving module 401 is configured to receive a performance level request sent by a storage space management device, which is used to query information about performance level of one or more LUNs in a storage device;

The calculating module 402 is configured to obtain the information about performance levels of the LUNs according to the performance level request; and The sending module 403 is configured to send a response to the storage space management device in response to the performance level request, which includes the information about performance levels of the LUN; and the storage space management device obtains performance levels of the LUN according to the information about performance levels of the LUNs so that data to be stored is written into a LUN of a corresponding performance level according to the accessing frequency level of the data to be stored included in a write-data instruction when the write-data instruction is received.

In the embodiment of the present invention, after receiving a request sent by a storage space management device 30 to query information about performance levels of the LUNs included in the storage device 40, the storage device 40 retrieves the information about performance level of the LUNs included in the storage device 40 and sends it to the storage space management device 30, so that the storage space management device 30 can obtain performance levels of the LUNs according to the information about performance levels. Therefore, the storage device in the embodiment of the present invention can obtain the performance levels of the LUNs without depending on a storage administrator to configure the performance level beforehand. In this way, when data needs to be written into the storage device 40 after a write-data instruction is received, the storage space management device can write data to be stored into LUNs of different performance levels according to the accessing frequency level of the data to be stored, thereby implementing LUN-specific hierarchical storage.

The following describes a storage device in detail by taking an example that information about performance level of a LUN is a performance value range of the LUN.

In the above embodiment, the performance level request may be defined as REPORT LUN CACPABILITY. The fields included in it are the same as those in the embodiment shown in FIG. 3, and are not described repeatedly here any further. The fields included in a response sent in response to the performance level request are the same as those in the embodiment shown in FIG. 3, and are not described repeatedly here any further. The calculating module 402 is specifically configured to obtain a performance value range of the LUN according to the WWN field of the LUN included in the performance level request.

Specifically, after receiving the performance level request sent by the storage space management device 30, the storage device 40 may find the LUN according to the WWN of the LUN, so as to obtain relevant information of the LUN. The information may at least include storage media type of a physical disk corresponding to the LUN. Because the LUN is a logical area and is mapped from one or more physical disks, the storage medium type of the physical disks corresponding to the LUN may decide the performance of the LUN. For example, the performance of an SSD is higher than that of an SAS/FC HDD, and the performance of an SAS/FC HDD is higher than that of an SATA/NL SAS HDD. Therefore, the performance of a LUN corresponding to an SSD is higher than the performance of a LUN corresponding to an SAS/FC HDD, and the performance of a LUN corresponding to an SAS/FC HDD is higher than the performance of a LUN corresponding to an SATA/NL SAS HDD.

Therefore, the storage device 40 may obtain a performance level of the LUN according to relevant information of the LUN. For example, the performance level of a LUN may be reflected by performance value ranges. For example, the performance value ranges of the LUN corresponding to the SSD are [80, 100], the performance value ranges of a LUN corresponding to an SAS/FC HDD are [60, 80], and the performance value ranges of a LUN corresponding to an SATA/NL SAS HDD are [40, 60].

Besides, the storage device 40 may obtain the performance value range of the LUN according to other relevant information such as the IO service pressure of the LUN, the current running state of the LUN, and the composite pattern of the LUN. The storage device may obtain the performance value range of the LUN after taking all kinds of factors into consideration.

The sending module 403 is specifically configured to send a response to the storage space management device 30 in response to the performance level request, where the response includes a performance value ranges of the LUNs so that the storage space management device 30 obtains the performance levels of the LUNs according to the performance value ranges of the LUN.

In another embodiment of the present invention, the storage space management device 30 monitors the time spent by the storage device in processing an input/output IO command. If the processing time exceeds a threshold defined for the performance level of the LUN corresponding to the IO command, the storage space management device 30 may send a performance level request to the storage device 40 to query the current performance level of the LUN.

Therefore, the receiving module 401 is further configured to receive the performance level request sent by the storage space management device. The detailed content of the performance level request is similar to what described above, and is not described here any further. It should be noted that the performance level request here is used to query the information about performance level of a specific LUN in the storage device.

The calculating module 402 is further configured to obtain the current information about performance level of the LUN according to the LUN information carried in the performance level request. After receiving the performance level request, the storage device may recalculate the current information about performance level according to factors such as the current IO pressure and running state of the LUN, system faults, and storage media of the physical disk corresponding to the LUN. Specifically, the current information about performance level of the LUN at least includes the current performance value range of the LUN. The detailed calculation method is similar to what is described above, and is not repeated here any further.

The sending module 403 is further configured to send a response to the storage space management device 30 in response to the performance level request, where the response sent in response to the performance level request includes the current information about performance level of the LUN; and the storage space management device 30 obtains the current performance level of the LUN according to the current information about performance level of the LUN.

After identifying the current performance level of the LUN, the storage space management device 30 may perform different operations depending on whether the performance level of the LUN has changed, and specifically, adjust the performance level of the LUN if the performance level of the LUN has changed. Assuming that the LUN has a corresponding storage resource pool, the LUN may be removed out of an original corresponding storage resource pool.

For details of the storage device 40 provided in the embodiment of the present invention, reference can be made to the description of the storage device in the method embodiment, and no repeated description is given here.

Figure 5:
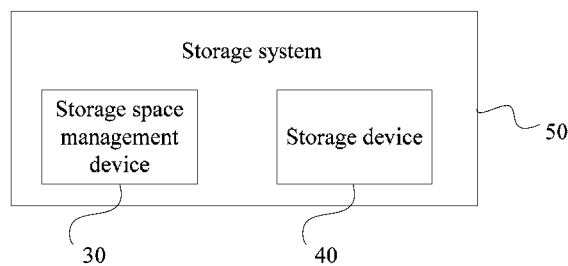
FIG. 5 is a schematic structural diagram of a storage system according to an embodiment of the present invention.

Further, an embodiment of the present invention provides a storage system 50. As shown in FIG. 5, the storage system includes a storage space management device 30 and a storage device 40.

The storage space management device 30 is configured to send a performance level request to the storage device 40, which is used to query information about performance levels of one or more LUNs in the storage device 40; receive a response sent by the storage device 40 in response to the performance level request, where the response includes the information about performance levels of the LUNs; and obtain performance levels of the LUNs according to the information about performance levels of the LUNs so that data to be stored is written into a LUN of a corresponding performance level according to the accessing frequency level of the data to be stored included in a write-data instruction when the write-data instruction is received.

The storage device 40 is configured to receive the performance level request sent by the storage space management device 30, where the performance level request is used to query information about performance levels of LUNs in the storage device; obtain the information about performance levels of the LUNs according to the performance level request; send a response to the storage space management device 30 in response to the performance level request, where the response sent in response to the performance level request includes the information about performance level of the LUN; and the storage space management device 30 obtains performance levels of the LUNs according to the information about performance levels of the LUNs so that data to be stored is written into a LUN of a corresponding performance level according to the accessing frequency level of the data to be stored included in a write-data instruction when the write-data instruction is received.

For detailed working of each module in the storage space management device 30, reference can be made to the corresponding module in the embodiment shown in FIG. 3; for detailed working of each module in the storage device 40, reference can be made to the corresponding module in the embodiment shown in FIG. 4, and details are not repeated here.

Figure 6:
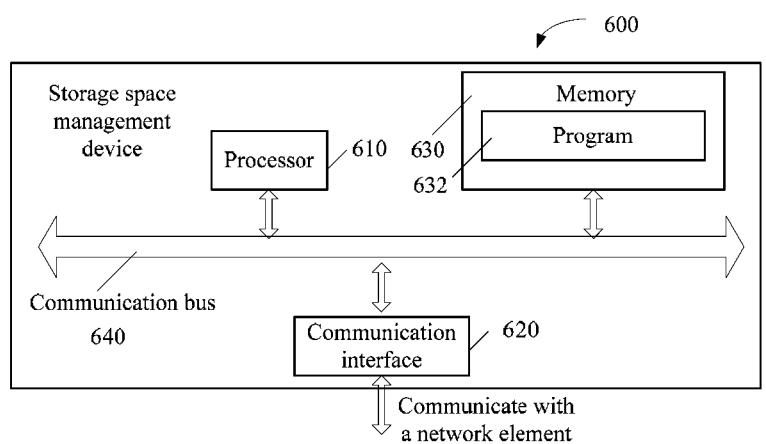
FIG. 6 is a schematic structural diagram of another storage space management device according to an embodiment of the present invention.

FIG. 6 is a schematic diagram of a storage space management device 600 according to an embodiment of the present invention. The storage space management device 600 may include a storage gateway device. The storage gateway device in the embodiment of the present invention refers to a heterogeneous virtualized storage gateway device. The embodiment of the present invention does not restrict the specific form of the storage space management device 600. The storage space management device 600 includes:

a processor (processor) 610, a communication interface (Communications Interface) 620, a memory (memory) 630, and a bus 640.

The processor 610, the communication interface 620, and the memory 630 communicate with each other through the bus 640.

The communication interface 620 is configured to communicate with a network element such as a storage device 700.

The processor 610 is configured to execute a program 632.

Specifically, the program 632 may include program codes, where the program codes include computer operation instructions.

The processor 610 may be a central processing unit CPU, or an application specific integrated circuit ASIC (Application Specific Integrated Circuit), or one or more integrated circuits configured to implement the embodiment of the present invention.

The memory 630 is configured to store the program 632. The memory 630 may include a high-speed RAM, or may further include a non-volatile memory (non-volatile memory), for example, at least one disk memory.

The program 632 may specifically include:

a sending module 301, configured to send a performance level request to a storage device, which is used to query information about performance level of one or more LUNs in the storage device;

a receiving module 302, configured to receive a response sent by the storage device in response to the performance level request, where the response includes the information about performance levels of the LUNs; and an obtaining module 303, configured to obtain performance levels of the LUNs according to the information about performance levels of the LUNs so that data to be stored is written into a LUN of a corresponding performance level according to the accessing frequency level of the data to be stored included in a write-data instruction when the write-data instruction is received.

For specific implementation of each module in the program 632, reference can be made to the corresponding module in the embodiment shown in FIG. 3, and details are not repeated here any further.

Figure 7:
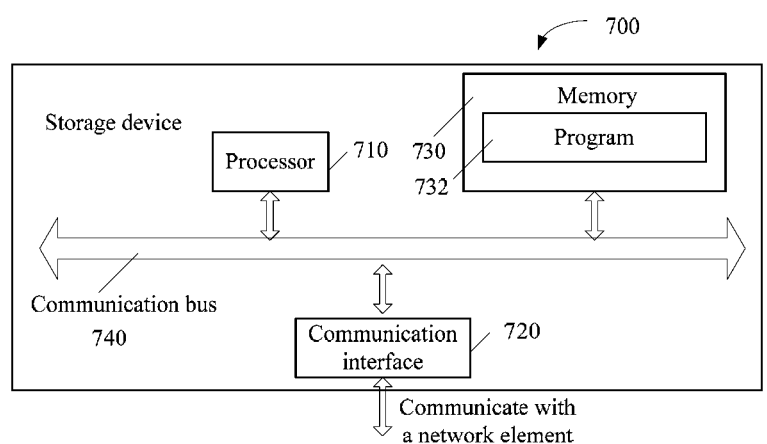
FIG. 7 is a schematic structural diagram of another storage device according to an embodiment of the present invention.

FIG. 7 is a schematic diagram of a storage device 700 according to an embodiment of the present invention. The storage device 700 may be a storage device known in the prior art, and the embodiment of the present invention does not restrict the specific form of the storage device 700. The storage device 700 includes:

a processor (processor) 710, a communication interface (Communications Interface) 720, a memory (memory) 730, and a bus 740.

The processor 710, the communication interface 720, and the memory 730 communicate with each other through the bus 740.

The communication interface 720 is configured to communicate with a network element such as a storage space management device 600.

The processor 710 is configured to execute a program 732.

Specifically, the program 732 may include program codes, where the program codes include computer operation instructions.

The processor 710 may be a central processing unit CPU, or an application specific integrated circuit ASIC (Application Specific Integrated Circuit), or one or more integrated circuits configured to implement the embodiment of the present invention.

The memory 730 is configured to store the program 732. The memory 730 may include a high-speed RAM, or may further include a non-volatile memory (non-volatile memory), for example, at least one disk memory.

The program 732 may specifically include:

a receiving module 401, configured to receive a performance level request sent by a storage space management device, which is used to query information about performance levels of one or more LUNs in a storage device;

a calculating module 402, configured to obtain the information about performance levels of the LUN according to the performance level request; and a sending module 403, configured to send a response to the storage space management device in response to the performance level request, where the response sent in response to the performance level request includes the information about performance levels of the LUNs; and the storage space management device obtains performance levels of the LUNs according to the information about performance levels of the LUNs so that data to be stored is written into a LUN of a corresponding performance level according to the accessing frequency level of the data to be stored included in a write-data instruction when the write-data instruction is received.

For specific implementation of each module in the program 732, reference can be made to the corresponding module in the embodiment shown in FIG. 4, and details are not repeated here any further.

It may be clearly understood by persons skilled in the art that, for the purpose of convenient and brief description, as for the specific working process of the foregoing device and module, reference can be made to the corresponding process in the foregoing method embodiments, and details are not described herein again.

In the embodiments provided in the present application, it should be understood that the disclosed device and method may be implemented in other manners. For example, the described apparatus embodiment is merely exemplary. For example, the module division is merely a logical function division and may be other division in actual implementation. For example, a plurality of modules or components may be combined or integrated into another device, or some features may be ignored or not performed. In addition, the displayed or discussed mutual couplings or direct couplings or communication connections may be implemented through some communication interfaces. The indirect couplings or communication connections between apparatuses or modules may be implemented in electrical, mechanical, or other forms.

The modules described as separate parts may or may not be physically separate, and parts displayed as modules may or may not be physical units, may be located in one position, or may be distributed on a plurality of network units. A part of or all of the modules may be selected according to actual needs to achieve the objectives of the solutions of the embodiments.

In addition, function modules in each of the embodiments of the present invention may be integrated into one processing module, or each of the modules may exist alone physically, or two or more modules are integrated into one module.

Finally, it should be noted that the foregoing embodiments are merely intended for describing the technical solutions of the present invention, other than limiting the present invention. Although the present invention is described in detail with reference to the foregoing embodiments, persons of ordinary skill in the art should understand that they may still make modifications to the technical solutions described in the foregoing embodiments, or make equivalent replacements to some or all the technical features thereof, without departing from the idea and scope of the technical solutions of the embodiments of the present invention.

What is claimed is:

1. In a storage device, a method for storing data in a storage device, the method comprising:

receiving a first performance level request sent by a storage space management device to query information about performance levels of a plurality of Logic Unit Numbers (LUNs) in the storage device, and wherein the first performance level request includes a world wide name (WWN) field used to identify the plurality of LUNs, and wherein a value contained in the WWN field in the performance level request is 0 (zero) to query the information about the performance levels of the plurality of LUNs in the storage device;

obtaining the information about the performance levels of the LUNs according to the first performance level request; and sending a first response to the storage space management device in response to the first performance level request, wherein the first response comprises the information about the performance levels of the plurality of LUNs and wherein the first response comprises a logical unit number list (LUN List) field through which the information about the performance levels of the plurality of LUNs is carried, and the LUN List field comprises the WWN of the plurality of LUNs and the information about the performance levels of each of the plurality of LUNs in the storage device, wherein the information about the performance levels of the plurality LUNs comprises performance value ranges of the plurality of LUNs.

2. The method according to claim 1, wherein: the first performance level request further comprises a select report field, wherein the select report field indicates whether the information about the performance levels of all the LUNs in the storage device needs to be queried or information about performance levels of a portion of the LUNs in the storage device needs to be queried; if the first performance level request is used to query the information about the performance levels of all the LUNs, a value contained in the select report field is 00; if the first performance level request is used to query the information about the performance levels of the portion of the LUNs, the value contained in the select report field is 01.

3. The method according to claim 1, wherein the first response further comprises a logical unit number list length (LUN List Length) field, which indicates a length of the LUN List field.

4. The method according to claim 1, further comprising: receiving a second performance level request sent by the storage space management device; obtaining current information about a performance level of a target LUN according to information about the target LUN included in the second performance level request; and sending a second response to the storage space management device in response to the second performance level request, wherein the second response comprises the current information about the performance level of the target LUN.

5. A computer program product for use in a storage device, the computer program product comprising computer executable instructions stored on a non-transitory computer readable medium in such a way that when executed causes a processor of the storage device to:

receive a first performance level request sent by a storage space management device to query information about performance levels of a plurality of Logic Unit Numbers (LUNs) in the storage device, and wherein the first performance level request includes a world wide name (WWN) field used to identify the plurality of LUNs, and wherein a value contained in the WWN field in the performance level request is 0 (zero) to query the information about the performance levels of the plurality of LUNs in the storage device;

obtain the information about the performance levels of the LUNs according to the first performance level request; and send a first response to the storage space management device in response to the first performance level request, wherein the first response comprises the information about the performance levels of the plurality of LUNs and wherein the first response comprises a logical unit number list (LUN List) field through which the information about the performance levels of the plurality of LUNs is carried, and the LUN List field comprises the WWN of the plurality of LUNs and the information about the performance levels of each of the plurality of LUNs in the storage device, wherein the information about the performance levels of the plurality LUNs comprises performance value ranges of the plurality of LUNs.

6. The computer program product according to claim 5, wherein: the first performance level request further comprises a select report field, wherein the select report field indicates whether the information about the performance levels of all the LUNs in the storage device needs to be queried or information about performance levels of a portion of the LUNs in the storage device needs to be queried; if the first performance level request is used to query the information about the performance levels of all the LUNs, a value contained in the select report field is 00; if the first performance level request is used to query the information about the performance levels of the portion of the LUNs, the value contained in the select report field is 01.

7. The computer program product according to claim 5, wherein the first response further comprises a logical unit number list length (LUN List Length) field, which indicates a length of the LUN List field.

8. The computer program product according to claim 5, further comprising computer executable instructions which causes a processor of the storage device to:

receive a second performance level request sent by the storage space management device; obtaining current information about a performance level of a target LUN according to information about the target LUN contained included in the second performance level request; and send a second response to the storage space management device in response to the second performance level request, wherein the second response comprises the current information about the performance level of the target LUN.

* * * * *